United States Patent
Schmitt

[15] 3,688,183
[45] Aug. 29, 1972

[54] HYBRID POWER REGULATOR COMPRISING RHEOSTAT AND DIODE

[72] Inventor: Arthur N. Schmitt, 6410 Redding, Houston, Tex. 77036

[73] Assignee: Michael P. Breston, Houston, Texas, a part interest

[22] Filed: Oct. 12, 1971

[21] Appl. No.: 188,321

[52] U.S. Cl. ..................323/80, 307/98, 307/146, 323/96, 338/120, 338/134, 338/179, 338/200
[51] Int. Cl. ..............................................H02m 5/06
[58] Field of Search......338/118, 120, 126, 128, 134, 338/159, 160, 178, 179, 172, 200; 323/9, 79, 80, 81, 94, 96; 307/146, 98, 115

[56] References Cited

UNITED STATES PATENTS 1,449,249   3/1923   Rhamstine.................338/128
3,180,999   4/1965   Kuykendall................307/146
2,797,286   6/1957   Montgomery.............338/126

Primary Examiner—Gerald Goldberg
Attorney—Michael P. Breston

[57] ABSTRACT

An AC power regulator is provided which employs both resistance and phase regulation. Between zero and half power, resistance regulation is employed in series with a unidirectional conducting device such as a diode. Between half power and full power, resistance regulation is employed in parallel with the diode which acts as a phase regulator. Accordingly, heat is generated in the rheostat only during one-half cycle of the load current. The maximum heat to be dissipated by the regulator is then equal to half the maximum heat to be dissipated by a regulator without phase regulation or diode.

3 Claims, 6 Drawing Figures

PATENTED AUG 29 1972  3,688,183
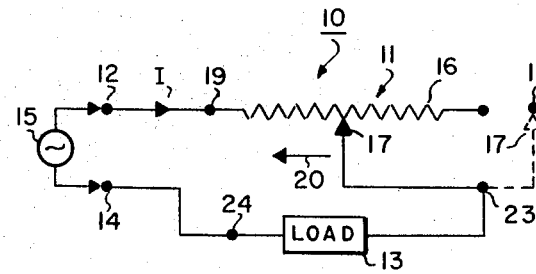
FIG. 1. PRIOR ART
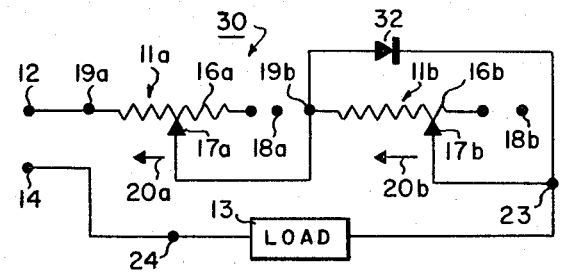
FIG. 2.
FIG. 3.
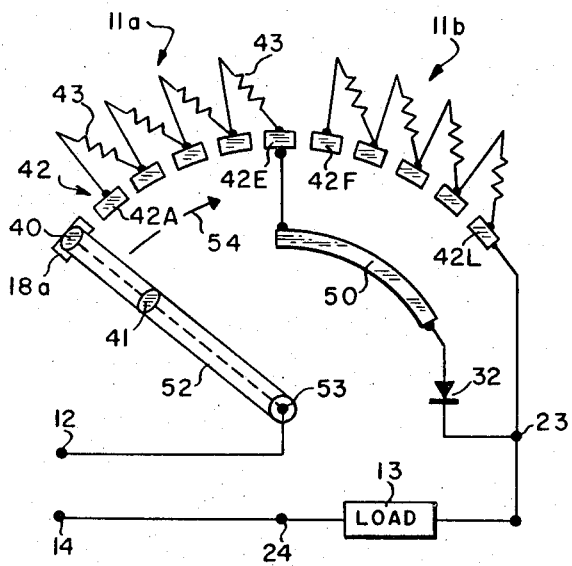
FIG. 5.
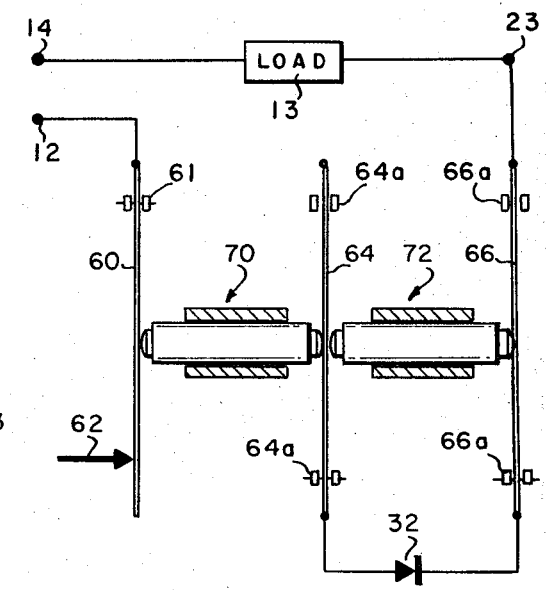
FIG. 4.
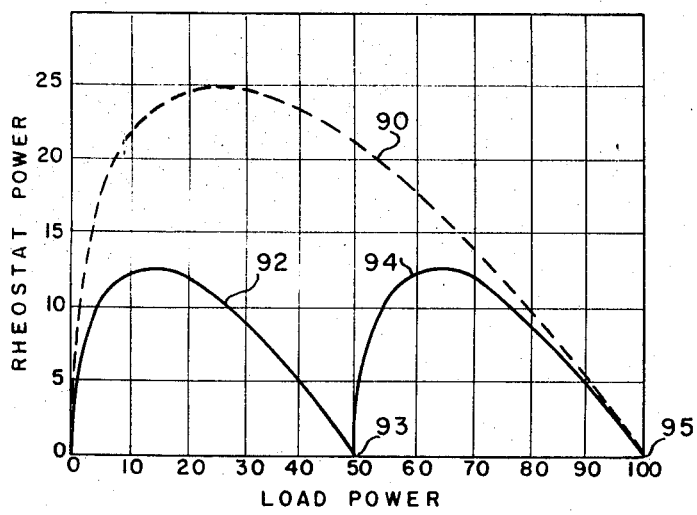
FIG. 6.
INVENTOR.
ARTHUR N. SCHMITT,
BY
MICHAEL P. BRESTON
ATTORNEY.

HYBRID POWER REGULATOR COMPRISING RHEOSTAT AND DIODE

BACKGROUND OF THE INVENTION

Rheostat-controlled power regulators are well known and extensively used. Variable-speed devices such as rotary drills, sewing machines, blenders, etc., use such power regulators. Since the load current continuously flows through the rheostat, heat is also continuously generated in the rheostat. The designer of such a rheostat-controlled regulator must carefully select the internal components of the regulator and provide sufficient heat dissipation. Rheostat-controlled regulators of known design are relatively expensive, bulky, and their housings are frequently made of metal, since plastic materials are unable to withstand high heat. For reasons of appearance, convenience, or economy, it may be desirable or necessary to use power regulators which generate a reduced amount of heat and which can be contained in plastic housings.

SUMMARY OF THE INVENTION

It is a broad object of the present invention to allow the load current to flow through the rheostat of a power regulator only during a portion of each current cycle. Conveniently such portion is a half cycle. In this manner, the maximum heat dissipated by the regulator is reduced by one half as compared to a conventional regulator.

In accordance with the present invention, a hybrid regulator is provided which employs both resistance and phase regulation. In its simplest form, the hybrid regulator comprises one or two rheostats and a single diode.

Between zero and one-half load power, the rheostat and the diode are connected in series, hence no current flows through the load during each consecutive half current cycle.

Between one-half and full-load power, the rheostat is connected in parallel with the diode, hence load current flows through the diode during each half current cycle and through the rheostat during each other half current cycle. No appreciable heat is generated in the regulator while current flows through the diode. The current flowing through the diode is half of the full-power current.

BRIEF DESCRIPTION OF THE DRAWINGS

FIG. 1 is a diagrammatic representation of a rheostat-controlled regulator of conventional design;

FIG. 2 is a diagrammatic representation of a hybrid regulator in accordance with the present invention;

FIG. 3 is one practical embodiment of the hybrid regulator shown in FIG. 2;

FIG. 4 is another practical embodiment of the hybrid regulator shown in FIG. 2;

FIG. 5 is a diagrammatic representation of a hybrid regulator employing a single resistance element; and FIG. 6 shows comparative curves of rheostat consumed power versus load power for the conventional regulator shown in FIG. 1 and the hybrid regulator of the present invention.

In the drawings the same numerals are used to designate the same parts and the same numerals when followed by a or b designate a similar or symmetrical parts.

FIG. 1 shows a conventional power regulator 10 including a rheostat 11 connected in series with a load 13 between two terminals 12 and 14 which receive an external AC voltage 15. Rheostat 11 includes a resistance element 16 and a wiper 17 which is movable in the direction of arrow 20 between open-circuit and short-circuit terminals 18 and 19, respectively. The amplitude of the AC current I flowing through the load 13 will depend on the position of wiper 17 relative to element 16. Wiper 17 is electrically connected to one load terminal 23, and terminal 14 is connected to the other load terminal 24. When current I flows through rheostat 11, it flows during each positive and negative half cycle thereof. Such current continuously generates heat in the resistance element 16. The continuous generation of heat is an inherent characteristic of a pure rheostat-controlled regulator.

FIG. 2 is a diagrammatic representation of a hybrid power regulator of this invention, generally designated as 30. Regulator 30 includes two rheostats 11a and 11b. Wiper 17a is connected to terminal 19b, and wiper 17b is connected to terminal 23. Between terminals 19b and 23 is connected a unidirectional conducting device, such as a diode 32. Thus, diode 32 is in series with rheostat 11a and selectively in parallel with rheostat 11b.

FIG. 3 shows a preferred arrangement of parts for a hybrid power regulator which is especially adapted for foot control. The regulator shown in FIG. 3 can be used, for example, to control the speed of a sewing machine. A wiper contact 40 ordinarily rests on the open circuit terminal 18a. Contact 40 slides on a plurality of segmented contacts 42 ranging for illustration from 42A to 42L. Between each consecutive pair of segment contacts is disposed a resistance element 43. There is provided no electrical connection between contacts 42E and 42F. An arcuate shunt 50 is disposed parallel to rheostat 11b and is electrically connected between terminal 42E and diode 32. A wiper contact 41 engages shunt 50. Contacts 40 and 41 are positioned on a wiper arm 52 pivotably mounted on a pivot 53. Wiper contact 41 engages shunt 50 after wiper 52 rotates in a clockwise direction 54 until wiper contact 40 engages segment contact 42E. Thus, again diode 32 is in series with rheostat 11a and selectively in parallel with rheostat 11b.

In the embodiment of the hybrid power regulator shown in FIG. 4, instead of using a rotatably mounted wiper 52, there is now employed a deflection blade 60 which is clampingly secured at one end to a fastening means 61. The other end of blade 60 is movable in response to a force 62. Two other deflection blades 64 and 66 are provided. The free ends of blades 64, 66 are secured to fastening means 64a, 66a, respectively. Blades 60 and 66 are electrically connected to terminals 12 and 23, respectively. Diode 32 is connected between blades 64 and 66. Sandwiched between 60 and 64 is a first carbon pile rheostat 70, and between blades 64 and 66 is sandwiched another carbon pile rheostat 72. Such carbon pile rheostats are commercially available. The resistance value of each such rheostat is dependent on the amount of compression to which the carbon piles are subjected. Again, diode 32 is in series with rheostat 70 and in parallel with rheostat 72.

In FIG. 5 is shown a diagrammatic representation of a hybrid power regulator including a single rheostat 80 having a resistance element 83 on which are movably mounted two wipers 81 and 82. Initially, wipers 81 and 82 contact the open circuit terminal 18, as shown by the dotted lines. Again diode 32 is in series with rheostat 80 through wiper 81, and is in parallel with rheostat 80 through wiper 82.

The operation of the various power regulators above described will now be given in connection with the curves illustrated in FIG. 6.

In FIG. 1, no current flows through load 13 when wiper 17 is at contact 18. This state is known as the O load power. When wiper 17 is at contact 19, maximum or full-load current flows through load 13. This state is known as full load power. Between O and full-load power the rheostat current varies from O to maximum, as the rheostat resistance varies from maximum to 0. Curve 90 in FIG. 6 shows the resulting rheostat power dissipation. For simplicity of illustration it is assumed in FIG. 6 that the voltage of source 15 is 100 volts, the resistance of load 13 is 100 ohms, and therefor the power is given in watts.

With reference now to FIGS. 3 and 6, as wiper 52 is rotated clockwise, wiper contact 40 causes the resistance value of rheostat 11a in series with diode 32 to decrease. When wiper contact 40 engages segment contact 42E, wiper contact 41 also engages shunt 50. Current will now flow from terminal 12 through wiper 52, shunt 50, diode 32, terminal 23, load 13, and terminal 14. Current can only flow during each positive half cycle for the polarity of diode 32 as shown. With no current flowing through rheostat 11a, load 13 will now receive one-half of the full load power, as shown at point 93, corresponding to 50 watts in FIG. 6.

The power delivered by rheostat 11a to load 13 will vary from O watts to 50 watts as represented by curve 92.

As wiper 52 continues to rotate clockwise in the direction of contact segment 42L, current will flow during each half positive cycle through diode 32 to load 13, and during each half negative cycle through the portion of rheostat 11b engaged by wiper contact 40. Thus, load 13 will receive more than the current corresponding to one-half of full-load current. When wiper contact 40 engages segment contact 42L, the diode 32 becomes short circuited and full load current will flow to load 13, bypassing rheostats 11a and 11b. When that happens the load power is 100 watts, and the power consumed in both rheostats 11a and 11b is 0 watts. Curve 94 depicts the relationship between the rheostat consumed power and the load power between the half power point 93 and the full power point 95.

With reference now to FIGS. 4 and 6, when no force 62 is applied, the two rheostats 70 and 72 are open circuited. As force 62 increases, the resistance value of rheostat 70 decreases approximately to 0 ohms. The power consumed by rheostat 70 is represented by curve 92.

As force 62 increases, blade 64 will begin to apply sufficient pressure against rheostat 72. The resistance value of rheostat 72 will decrease as the pressure applied thereon by blade 64 increases. During each positive half cycle, current will flow from terminal 12 through blade 60, rheostat 70, blade 64, diode 32, blade 66 and into load 13. During each negative half cycle, current will flow from terminal 12, blade 60, rheostat 70, blade 64, rheostat 72, blade 66 and into load 13. Curve 94 represents the rheostat power versus load power.

It will be noted that curves 92 and 94 have each a maximum rheostat power of 12.5 watts which is one-half of the maximum power, or 25 watts, generated in the rheostat 11 of the conventional power regulator 10 shown in FIG. 1. When the rheostats 70 and 72 have both achieved 0 ohms, diode 32 is short circuited and load 13 receives full power or 100 watts corresponding to point 95 in FIG. 6.

With reference to FIGS. 5 and 6, wiper 81 first moves from right to left to decrease the resistance value of rheostat 80 which is in series with diode 32. When the resistance value of rheostat 80 is 0, load 13 will receive one-half of the full load power, corresponding to point 93 of FIG. 6. Curve 92 again provides the relationship between rheostat and load power. Thereafter, wiper 82 is moved from right to left to decrease the resistance value of rheostat 80 which is now in parallel with diode 32. Current will now flow from terminal 12 through wiper contact 81, diode 32, and into load 13 during each positive half cycle, and current will flow from terminal 12 through wiper contact 82 and into load 13 during each negative half cycle. When wiper 82 reduces the resistance value of rheostat 80 to 0, diode 32 is short circuited and load 13 will receive full load power, corresponding to point 95 in FIG. 6. Curve 94 gives the rheostat versus load power between the half power point 93 and the full power point 95.

While this invention has been described with reference to specific embodiments, variations are possible and will readily become apparent to those skilled in the art.

What is claimed is:

1. A AC power regulator for supplying current to a load, said regulator in a first condition supplying no current to the load, in a second condition supplying half of the full load current, and in a third condition supplying full load current, said regulator comprising:

rheostat means having a resistance value which is adjustable between no load current and full load current, rectifying means, means connecting the rectifying means to the rheostat means for blocking the flow of current through the rheostat means during half of each current cycle, thereby providing to the load a current whose amplitude ranges between said first and said second conditions, and means connecting said rectifying means to the rheostat means to allow current to flow through the rectifying means during one-half of each current cycle and through the rheostat means during the other half of each current cycle, thereby providing to the load a current whose amplitude ranges between said second and third conditions.

2. The regulator of claim 1 wherein, said rheostat means include: a plurality of segment contacts, a rotatably-mounted wiper contact to engage said segment contacts, and said rectifying means is connected between said load and one of said segment contacts.

3. The regulator of claim 1 wherein, said rheostat means include at least two pressure-responsive resistance elements, and
said rectifying means is connected in parallel with one of said resistance elements.

* * * * *